Nov. 11, 1958
R. F. HIGH ET AL
2,859,483
COALESCENCE OF PRE-MOLDED PARTS
Filed Jan. 11, 1957
2 Sheets-Sheet 1
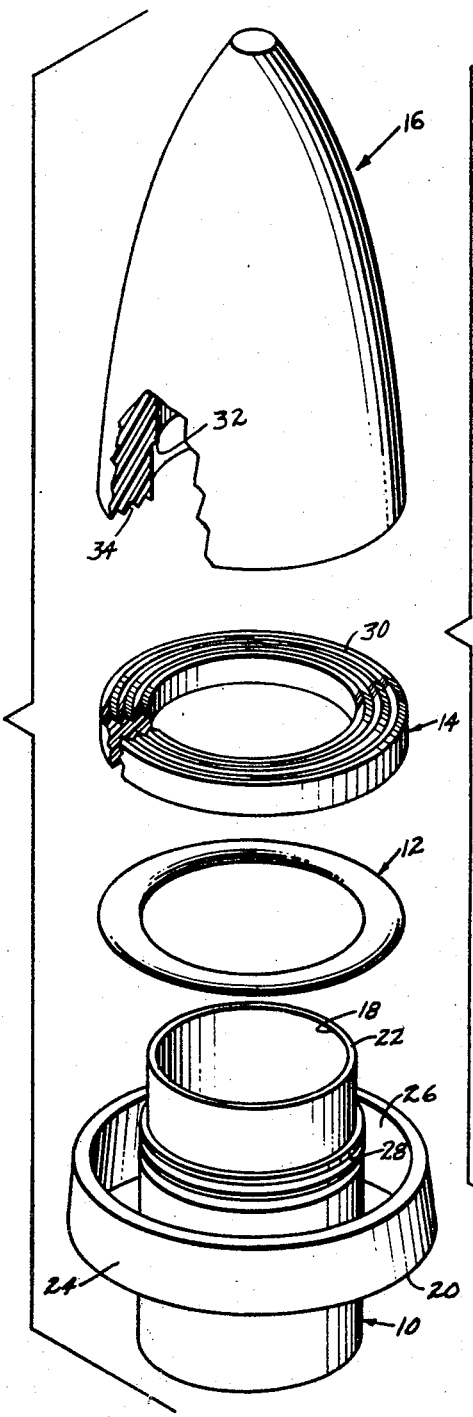
Fig. 1.
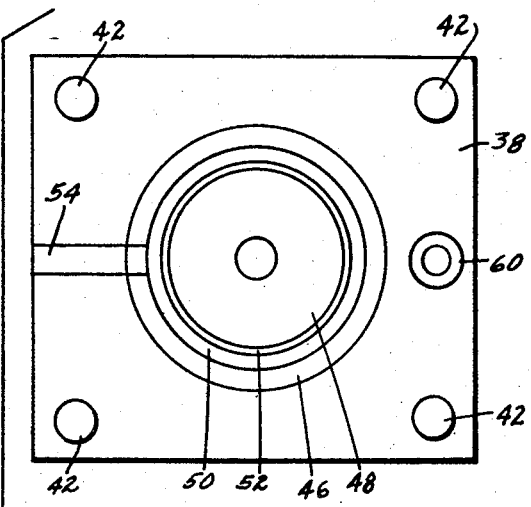
Fig. 2.
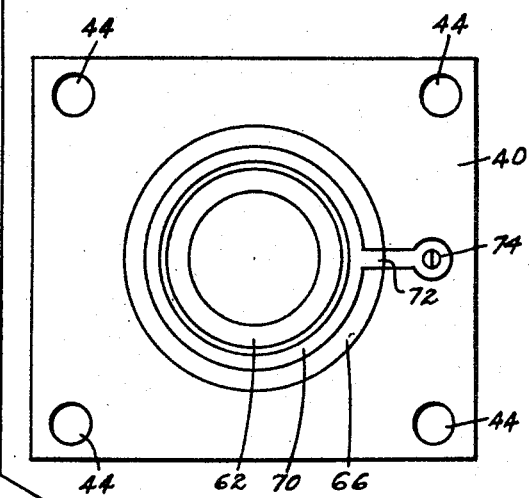
INVENTOR.
Roy F. High
Morris L. Barfield
BY Nov. 11, 1958        R. F. HIGH ET AL        2,859,483
COALESCENCE OF PRE-MOLDED PARTS
Filed Jan. 11, 1957        2 Sheets-Sheet 2

INVENTOR.
Roy F. High
Morris L. Barfield
BY

United States Patent Office 2,859,483
Patented Nov. 11, 1958

2,859,483

COALESCENCE OF PRE-MOLDED PARTS

Roy F. High and Morris L. Barfield, Washington, D. C., assignors to the United States of America as represented by the Secretary of the Army Application January 11, 1957, Serial No. 633,802

4 Claims. (Cl. 18—59)

(Granted under Title 35, U. S. Code (1952), sec. 266)

The invention described herein may be manufactured and used by or for the Government for governmental purposes without the payment to us of any royalty thereon.

It has been a recognized problem to those skilled in the art to which this invention pertains that it is relatively difficult to obtain a hermetic juncture between a thermoplastic resin, such as polyethylene, and a metal. The combination of these two materials in a structure is relatively important when it is desirable to house frangible materials or shock-sensitive components in the thermoplastic resin, such as polyethylene, and to mount the polyethylene member on a metallic base. Where the inclosed components or frangible materials are substantially affected by contaminated air or moisture, it is important to have a good seal between the thermoplastic resin and the metal.

Accordingly, the principal object of this invention is to provide a superior seal between a thermoplastic resin body and a metallic member.

Another object of this invention is to provide for an assembly of parts whereby strict tolerances and allowances are eliminated.

An important object of this invention is to provide a method by which premolded polyethylene parts are sealed to a metallic member.

Still another important object of this invention is to provide a method for fastening premolded thermoplastic members to a metal using an injection molding process, thereby eliminating mechanical fastening.

Another object of this invention is the provision of a method of sealing adapted to high speed production.

The specific nature of the invention as well as other objects, uses and advantages thereof will clearly appear from the following description and from the accompanying drawing, in which:

Figure 1 is an enlarged exploded perspective view of the preformed components employed in the seal structure of this invention with certain parts broken away.

Figure 2 is a plan view of the mating surfaces of the injection mold utilized in this invention with certain parts removed.

Figure 3:
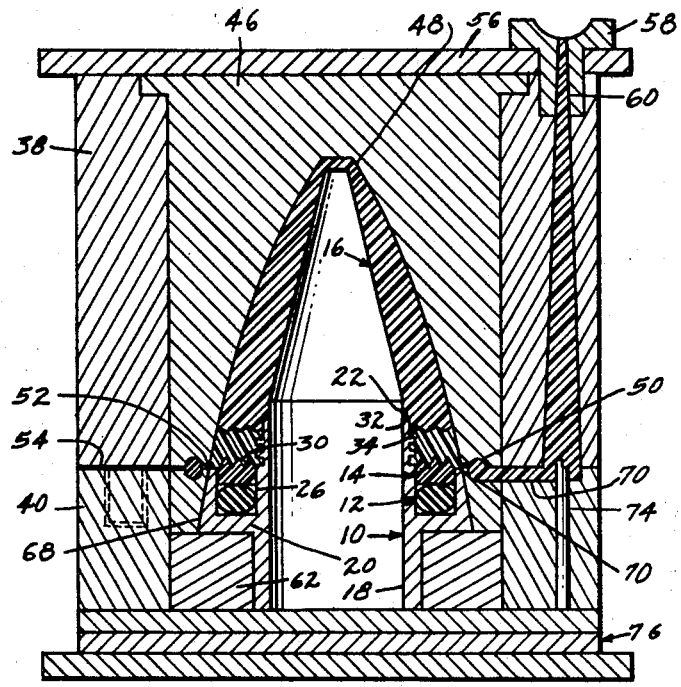
Figure 3 is a cross sectional view of the injection mold inclosing the pre-formed parts of Figure 1 in the die cavity.

Referring to Figure 1, the pre-formed parts employed for this invention may comprise a substantially cylindrical metallic member, an O-ring, a thermoplastic filler ring, and a thermoplastic conical body designated generally as 10, 12, 14 and 16, respectively.

Cylindrical member 10 may comprise an elongated bore 18 extending longitudinally therethrough. A lateral extending flange 20 is preferably formed integral with member 10 and is spaced from end 22 of member 10. Concentrically mounted with cylindrical member 10 and extending integrally from flange 20 towards end 22 is a sleeve 24 substantially conical in external configuration. Spaced from end 22 and recess 26 which is defined by sleeve 24 flange 20 and member 10 are circumferentially extending grooves 28. The form of these grooves 28 may be obviously varied for purposes of this invention.

O-ring 12 is of conventional fabrication and is preferably of a size to conveniently fit into recess 26. Silicone rubber has been found to perform satisfactorily for ring 12. Ring 14 is preferably premolded from a thermoplastic resin, such as polyethylene, and is of such a relative size to also conveniently fit into recess 26. As shown, ring 14 may be substantially rectangular in cross section but preferably presents a finned surface 30 for reasons that will become evident shortly. Conical body 16 usually employed to house, mount, inclose or embed desirable frangible materials or shock-sensitive components preferably is premolded from a thermoplastic resin, such as polyethylene. An internal shoulder 32 is provided for mating with the external shoulder presented by end 22 of member 10. Further, it is desirable that the base of the conical body 16 present finned surface 34 substantially similar to finned surface 30 of ring 14.

The injection mold that may be employed in carrying out the teachings of this invention may comprise mating stationary die member 38 and force die member 40 (Figures 2 and 3). Die member 38 may be provided with the usual guide pins 42 for reception in corresponding bores 44 in force member 40. Rigidly mounted in die member 38 is member 46 having an internal generally conical die surface 48 that is adapted to substantially neatly inclose a conical body 16 when the die members are closed. Member 46 is provided with a circular half round runner 50 concentric with surface 48. Member 46 is provided with a substantially circular ring gate 52 to provide communication of half round runner 50 with the die cavity formed by surface 48. For purposes of venting any inclosed undesirable air in the die cavity formed by die members 38 and 40 when the injection cycle has commenced, an air vent 54 preferably extends from half round runner 50 to the outside atmosphere substantially as shown. A conventional plate 56 may be mounted on stationary die member 38 for securement of member 46 and a sprue bushing 58 in die member 38. Sprue bushing 58 is provided with a conventional bore 60, which extends through die member 38.

The force die member 40 is provided with an annular body or ring 62 to circumferentially engage cylindrical member 10. Body 62 is preferably of such a thickness as to engage shoulder 64 of flange 20 (Figure 3). To maintain cylindrical member 10 relatively immovable longitudinally in die member 40 by cooperation with body 62, another annular body (Figure 3) or ring 66 is preferably utilized. Ring 66 is provided with substantially conical surface 68 that conveniently embraces the external surface of sleeve 24. For purposes of providing a full round runner, a half round runner 70 is formed in ring 66 for cooperation with half round runner 50. An elongated runner 72 extends from half round runner 70 to communicate with sprue bore 60. Die member 40 may be provided with the usual knock out pins (not shown) and the conventional sprue retainer 74. The usual plates generally denoted at 76 are provided on die member 40 to immovably mount ring 62 and suitably mount the desired knock-out pins and sprue retainer 74. The construction and disposition of plates 76 have not been shown in detail since they do not perform any critical functions in carrying out the teachings of this invention.

Referring to Figure 3, when the die members 38 and 40 are in a substantially open position and with ring 66 removed, cylindrical member 10 may be placed in die member 40 to be embraced by ring 62. Ring 66 is then placed over sleeve 24. O-ring 12 may then be disposed in recess 26 with the premolded ring 14, of thermoplastic such as polyethylene, positioned in recess 26 having the finned surface 30 adjacent to the opening of recess 26 substantially as shown. The premolded thermoplastic body 16, which is preferably fabricated from the same resin as ring 14, is mounted on member 10 with the external shoulder presented by end 22 of the latter abutting against internal shoulder 32 of body 16. Thus it will be observed that a space will be provided between the finned surface 30 and 34 with grooves 28 freely accessible between these finned surfaces.

Die members 38 and 40 may now be advantageously closed. A molten thermoplastic resin which is preferably identical to the resin employed for ring 14 and body 16 is injected through bore 60 through elongated runner 72 into the full round runner, which is comprised of half round runner 50 and half round runner 70. The circumferentially extended ring gate 52 is preferably employed so that the molten plastic may be immediately and most thoroughly injected into the space between finned surfaces 30 and 34. The thermoplastic resin is preferably injected at a pressure from 3000 to 5000 p. s. i. and a temperature from 375° F. and 400° F. Since the thermoplastic resins employed are mutually compatible a coalescence will occur at the respective finned surfaces 30 and 34. It has been found in practice that the finned surfaces result in the desired coalescence. Further, as to surface 30, it has been found that the pressure of injection is more evenly distributed through ring 14 to O-ring 12 so that a substantially ideal moisture proof and air tight seal is obtained. It will also be observed that the molten thermoplastic resin will be firmly embedded in the grooves 28 to substantially immovably mount body 16 on member 10. After suitable curing or cooling which will be accompanied by a generally negligible shrinkage of the thermoplastic, the die members 38 and 40 are opened and the finished unit product is removed by first conveniently removing ring 66.

Figure 4:
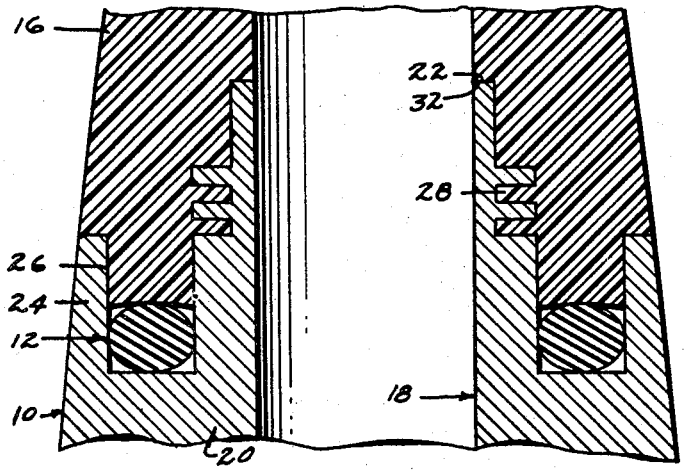
Figure 4 is a longitudinal sectional view showing the final seal between polyethylene body and the metallic member.

As can be observed in Figure 4, the thermoplastic resins are integrally united with a relatively immovable juncture between the thermoplastic resin body and the member 10. Due to the pressures developed during injection of the thermoplastic resin and even after slight shrinkage of the resin because of cooling, ring 12 is pressurized and in firm engagement with the surfaces of recess 26 and the integrally formed thermoplastic resin body. The invention thus provides a substantially moisture-proof and air-tight seal between two mutually incompatible materials such as metal and polyethylene or other thermoplastic resin.

It will be apparent that the embodiments shown are only exemplary and that various modifications can be made in construction and arrangement within the scope of the invention as defined in the appended claims.

We claim:
1. A method of providing a moisture-proof and airtight seal between a premolded thermoplastic body and a metallic member by pressurizing a sealing material between said body and said member, which method comprises: placing said sealing material on said member; mounting a thermoplastic filler material of substantially the same material as said body adjacent said sealing material; positioning said body in close proximity to said member and spaced from said filler material; injecting a thermoplastic resin material of substantially the same material as said body between said body and said filler material at a predetermined temperature and pressure, so that said plastics coalesce to form an integral structure and said sealing material becomes pressurized.

2. A method of providing a moisture-proof and airtight seal between a premolded polyethylene body and a metallic member, which method comprises the steps of: placing a sealing member on said metallic member; mounting a premolded polyethylene filler on said metallic member adjacent said sealing member; positioning said body in close proximity to said members; and injecting polyethylene between said body and said filler at a predetermined temperature and pressure, so that said body and said filler become integrally united, and said sealing member is pressurized to provide a moisture-proof and airtight juncture between said body and said metallic member.

3. A method of providing a moisture-proof and airtight seal between a premolded polyethylene body having a finned surface, and a metallic member having grooves and a recess, which method comprises the steps of: inserting an O-ring in said recess; placing a premolded polyethylene ring having a finned surface in said recess on said O-ring; mounting said body on said member and spaced from said grooves and said recesses; and injecting molten polyethylene around said grooves and between said finned surfaces at a predetermined temperature and pressure, so that said molten polyethylene coalesces with the polyethylene of said body and premolded ring to form an integral polyethylene structure firmly embedded in said grooves and said recess and so that said O-ring is pressurized to provide a moisture-proof and airtight juncture between said structure and said member.

4. A method of providing a moisture-proof and airtight seal between a premolded polyethylene conical body having finned surfaces on its base and a hollow cylindrical metallic member having holding grooves and an enlarged annular recess at one end, which method comprises the steps of: inserting a silicone rubber O-ring in said recess; placing a premolded polyethylene ring in said recess and, on said O-ring, said polyethylene ring having finned surfaces disposed in the opening of said recess; mounting said conical body on said one end and longitudinally spaced from said grooves and said recess; positioning said member in an injection mold; and injecting molten polyethylene around said grooves and between said finned surfaces at a predetermined temperature and pressure, so that said molten polyethylene coalesces with the polyethylene of said body and said premolded ring to form an integral polyethylene structure firmly embedded in said grooves and said recess and said O-ring is pressurized to provide a moisture-proof and airtight juncture between said structure and said member.

References Cited in the file of this patent
UNITED STATES PATENTS

| | | |
|---|---|---|
| 1,151,614 | Putnam | Aug. 31, 1915 |
| 2,002,366 | Eto | May 21, 1935 |
| 2,313,074 | Jewell | Mar. 9, 1943 |
| 2,504,936 | Payne | Apr. 18, 1950 |
| 2,536,898 | Works | Jan. 2, 1951 |
| 2,644,199 | Miller | July 7, 1953 |
| 2,710,113 | Pritchard | June 7, 1955 |
| 2,763,032 | Fay | Sept. 18, 1956 |